I

United States Patent
Cosme et al.

(10) Patent No.: US 10,538,281 B2
(45) Date of Patent: Jan. 21, 2020

(54) FAIRING ASSEMBLY FOR AT LEAST ONE AXLE OF A COMMERCIAL VEHICLE

(71) Applicant: Daimler AG, Stuttgart (DE)

(72) Inventors: Carlos Cosme, Vancouver, WA (US);
Manjul Gupta, Beaverton, OR (US);
Morris Henry, Happy Valley, OR (US);
Nathan Hill, Sherwood, OR (US);
Scott Sargeant, Portland, OR (US);
Paolo Zanetti, Portland, OR (US)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/553,893

(22) PCT Filed: Feb. 23, 2016

(86) PCT No.: PCT/EP2016/000313
§ 371 (c)(1),
(2) Date: Aug. 25, 2017

(87) PCT Pub. No.: WO2016/134847
PCT Pub. Date: Sep. 1, 2016

(65) Prior Publication Data
US 2018/0072354 A1 Mar. 15, 2018

(30) Foreign Application Priority Data
Feb. 27, 2015 (GB) .................................. 1503330.1

(51) Int. Cl.
*B62D 35/00* (2006.01)
(52) U.S. Cl.
CPC .......... *B62D 35/001* (2013.01); *B62D 35/008* (2013.01); *Y02T 10/82* (2013.01)

(58) Field of Classification Search
CPC .... B62D 35/001; B62D 35/00; B62D 35/005; B62D 35/007; B62D 37/02; B62D 35/02;
(Continued)

(56) References Cited

U.S. PATENT DOCUMENTS 7,806,464 B2 * 10/2010 Cardolle ............... B62D 35/001
296/180.1
8,251,436 B2 * 8/2012 Henderson ........... B62D 35/001
293/117

(Continued)

FOREIGN PATENT DOCUMENTS

| GB | 2 348 400 A | 10/2000 |
| WO | WO 2004/062953 A2 | 7/2004 |
| WO | WO 2013/174410 A1 | 11/2013 |

OTHER PUBLICATIONS

PCT/EP2016/000313, International Search Report dated Jun. 2, 2016 (Two (2) pages).

*Primary Examiner* — D Glenn Dayoan
*Assistant Examiner* — Sunsurraye Westbrook
(74) *Attorney, Agent, or Firm* — Crowell & Moring LLP

(57) ABSTRACT

A fairing assembly for at least one axle of a commercial vehicle is disclosed. The fairing assembly includes at least one forward fairing configured to be arranged at least partially in front of a drive wheel of the axle with respect to the longitudinal direction of the vehicle and at least one rear fairing configured to be arranged at least partially aft of the drive wheel. Each of the fairings includes at least one first portion made of a first material and at least one second portion adjoining the respective first portion where the second portion is made of a second material different from the first material.

12 Claims, 4 Drawing Sheets

(58) Field of Classification Search
CPC ...... B62D 33/06; B62D 35/008; B62D 25/12; B62D 25/186; B62D 33/0604
USPC ...... 296/180.2, 180.1, 180.3, 151, 155, 166, 296/26.09, 91; 180/903, 309, 65.1, 68.1, 180/89.1, 89.12; 280/163, 164.1, 166, 280/407, 833, 407.1, 438.1
See application file for complete search history.

(56) References Cited

U.S. PATENT DOCUMENTS

| | | | |
|---|---|---|---|
| 9,027,983 B2 * | 5/2015 | Butler | B62D 25/188 296/180.4 |
| 9,308,949 B1 * | 4/2016 | Mihelic | B62D 35/001 |
| 9,663,157 B2 * | 5/2017 | Butler | B62D 25/188 |
| 2010/0066123 A1 | 3/2010 | Ortega et al. | |
| 2011/0272964 A1 | 11/2011 | Henderson et al. | |
| 2014/0117712 A1 | 5/2014 | Butler et al. | |
| 2015/0232137 A1 † | 8/2015 | Butler | |

\* cited by examiner
† cited by third party

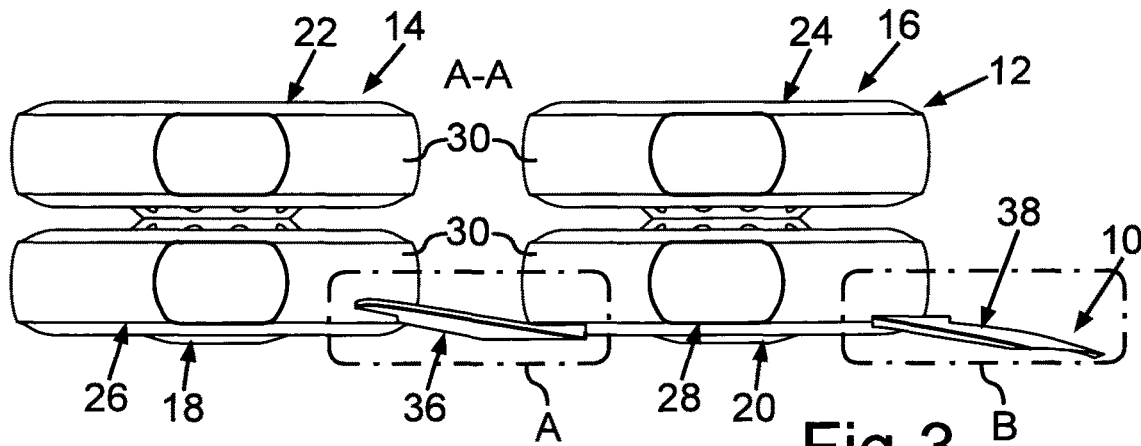
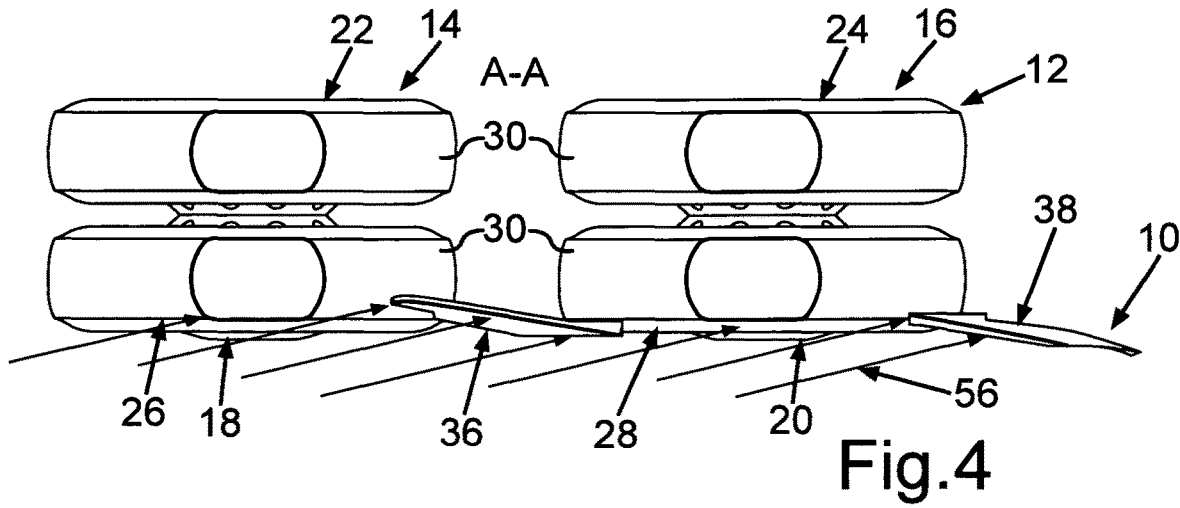
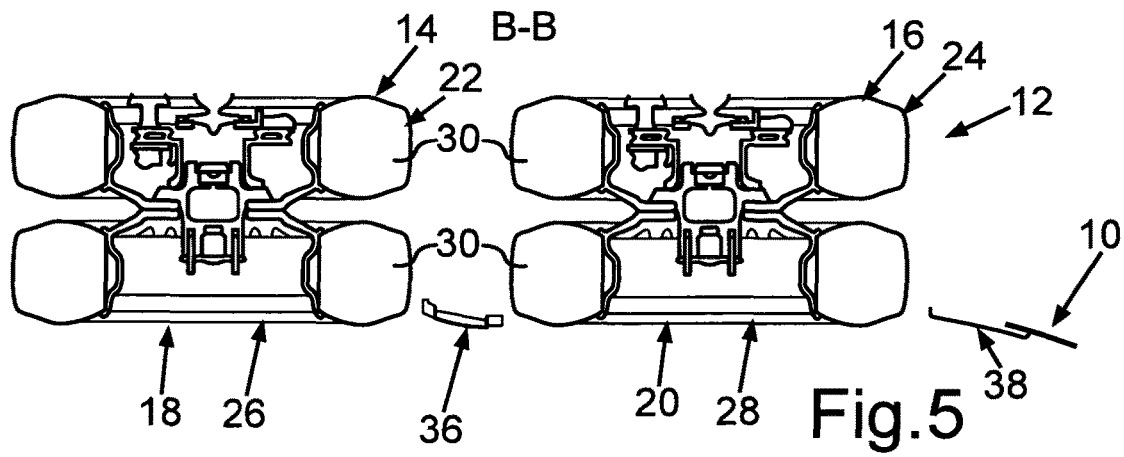

FAIRING ASSEMBLY FOR AT LEAST ONE AXLE OF A COMMERCIAL VEHICLE

BACKGROUND AND SUMMARY OF THE INVENTION

The invention relates to a fairing assembly for at least one axle of a commercial vehicle.

WO 2013/174410 A1 shows a wing-guiding device for a utility vehicle, the wing-guiding device having an air-guiding system which, to reduce the air resistance of the utility vehicle, has at least one air-guiding element arranged on a rear end.

Moreover, WO 2004/062953 A2 shows a cab chassis fairing for a tractor unit of an articulated vehicle, the fairing comprising a substantially flat panel extending along a side of the tractor unit adjacent to the ground, the panel having one or more openings for venting air from beneath a trailer. Thus, it is known from the general prior art to use fairings for commercial vehicles to guide air in order to reduce the drag of the vehicle.

It is an object of the present invention to provide a fairing assembly for at least one axle of a commercial vehicle, by means of which fairing assembly particularly advantageous aerodynamics of the vehicle can be realized.

The invention relates to a fairing assembly for at least one axle of a commercial vehicle. The fairing assembly comprises at least one forward fairing configured to be arranged at least partially in front of a drive wheel of the axle with respect to the longitudinal direction of the vehicle. Moreover, the fairing assembly comprises at least one rear fairing configured to be arranged at least partially aft of the drive wheel. Each of the fairings comprises at least one first portion made of a first material and at least one second portion adjoining the first portion, wherein the second portion is made of a second material different from the first material. For example, the respective second portion forms a soft extension or a soft panel extension of the respective fairing, the soft extension being softer than the first portion. Using different materials for the respective portions allows for an increase in the effective surface area of the respective fairing forming an aerodynamic panel with little impact on the durability or structural integrity of the whole fairing. For example, the second material is flexible or more flexible than the first material so that borders of an effective aero shape of the fairing can be extended well into a collision zone. It has been shown that using two different materials for the portions and thus the respective fairing allows realizing a particularly high aerodynamic performance of the respective fairing so that, for example, the drag of the commercial vehicle can be kept particularly low. Hence, the commercial vehicle which is, for example, a tractor can be driven particularly efficiently.

In a particularly advantageous embodiment of the invention the first material is a first plastic material. Thus, a particularly high aerodynamic performance of the fairing assembly and thus the commercial vehicle can be realized, wherein the weight of the fairing assembly can be kept particularly low.

Preferably, the first plastic material is a semi-rigid material such as a thermoplastic elastomer based on olefin (TPO). Thus, the first portion made of a semi-rigid material such as TPO or similar is designed to maintain an aerodynamic shape under normal operating conditions but deflect when impacted.

In a further advantageous embodiment of the invention the second material is a second plastic material so that a particularly high aerodynamic performance of the fairing assembly can be realized.

Preferably, the second plastic material is a semi-flexible material such as an Ethylene-Propylene-Dien-Monomer (EPDM) or similar. For example, the second portion is designed to maintain an aerodynamic shape under most operating conditions but deflect when impacted. Thus, by using different materials for the portions of the respective fairing the respective portions can be adapted to their respective functions in a need-based manner.

In a particularly advantageous embodiment of the invention the respective first portion has a higher rigidity than the respective second portion. In other words, the second portion is more flexible or softer than the first portion so that the second portion can bend or deflect when impacted without any damage of the respective fairing. Preferably, the durometer of the flexible second material is chosen to be aerodynamically stable while providing sufficient impact absorption to withstand frequent impacts with rigid objects. The flexible second material is very durable but might also be considered as a sacrificial piece intended to be replaced as needed. Thereby, significant relative motions between the first portion and the softer second portion can occur without any damage of the respective fairing.

In a further advantageous embodiment the respective second portion forms a respective edge region of the respective fairing. Thus, air can be guided particularly advantageously. Moreover, the respective first portion can be protected by the second portion. For example, the second portion is reversibly mounted on the first portion. Thus, the second portion can be mounted on and dismounted from the first portion in a non-destructive manner.

In order to realize a particularly high aerodynamic performance, in a further embodiment of the invention the forward fairing extends in the longitudinal direction of the vehicle from front to back outwardly with respect to the transverse direction of the vehicle. Thereby, air can be guided in a particularly advantageous manner by the forward fairing.

Moreover, in a particularly advantageous embodiment of the invention, the rear fairing extends in the longitudinal direction of the vehicle from front to back outwardly with respect to the transverse direction of the vehicle. Thereby, air that would normally flow towards and around a trailer or a landing gear of the trailer coupled to the commercial vehicle which is, for example, configured as a tractor can be diverted particularly advantageously.

The invention also relates to a commercial vehicle, in particular a tractor configured to pull a trailer, the commercial vehicle having at least one axle and at least one fairing assembly according to the present invention. Advantages and advantageous embodiments of the fairing assembly according to the present invention are to be regarded as advantages and advantageous embodiments of the commercial vehicle according to the present invention and vice versa.

Further advantages, features, and details of the invention derive from the following description of a preferred embodiment as well as from the drawings. The features and feature combinations previously mentioned in the description as well as the features and feature combinations mentioned in the following description of the figures and/or shown in the figures alone can be employed not only in the respectively indicated combination but also in other combination or taken alone without leaving the scope of the invention.

BRIEF DESCRIPTION OF THE DRAWINGS

FIG. 3 is a schematic sectional view of the fairing assembly along a cut line A-A shown in FIG. 1;

FIG. 4 is a further schematic sectional view of the fairing assembly along the cut line A-A;

FIG. 5 is a further schematic sectional view of the fairing assembly along a cut line B-B shown in FIG. 1;

DETAILED DESCRIPTION OF THE DRAWINGS

In the figures the same elements or elements having the same functions are indicated by the same reference signs.

Figure 1:
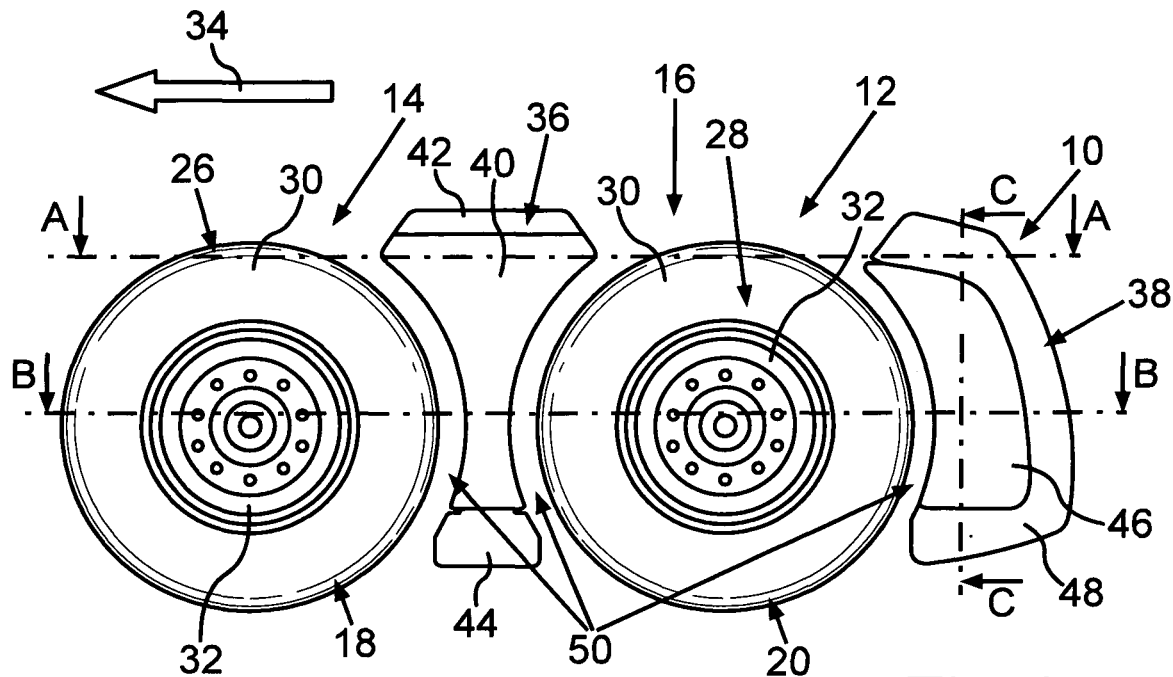
FIG. 1 is a schematic side view of a fairing assembly for a tandem axle of a commercial vehicle in the form of a tractor, the fairing assembly comprising a forward fairing arranged between two drive axles of the tandem axle, and at least one rear fairing arranged behind the drive axles.

FIG. 1 shows in a schematic side view a fairing assembly 10 for a tandem axle 12 of a commercial vehicle in the form of a tractor configured to pull a trailer which can be pivotably coupled to the tractor. The tandem axle 12 comprises a first drive axle 14 and a second drive axle 16, wherein the first drive axle 14 is a forward drive axle and the second drive axle 16 is a rear drive axle since the drive axle 16 is arranged behind the drive axle 14 in the longitudinal direction of the vehicle. As can be seen from FIG. 2, the respective drive axles 14 and 16 comprise respective lateral twin wheels 18 and 20, wherein the twin wheels 18 and 20 comprise respective wheels 22 and 24 being inboard wheels. The respective twin wheels 18 and 20 further comprise respective wheels 26 and 28 being outward wheels. The wheels 26 and 28 are shown in FIG. 1, wherein the wheels 22, 24, 26 and 28 are respective drive wheels since the commercial vehicle (tractor) can be driven by the drive wheels. As can be seen from FIG. 1, the respective wheels 22, 24, 26 and 28 comprise respective tires 30 and respective rims 32 on which the respective tires 30 are mounted. In FIG. 1 a directional arrow 34 illustrates the direction of forward movement of the commercial vehicle.

The fairing assembly 10 is used to realize particularly advantageous aerodynamics of the vehicle and comprises a lateral forward fairing 36 arranged at least partially between the wheels 26 and 28. Thus, the forward fairing 36 is arranged in front of the drive wheel 28. Moreover, the fairing assembly 10 comprises at least one lateral rear fairing 38 arranged at least partially aft of the rear drive wheel 28. The forward fairing 36 comprises a first portion 40 and second portions 42 and 44 adjoining the first portion 40. Moreover, the rear fairing 38 comprises a first portion 46 and a second portion 48 adjoining the first portion 46. The respective first portions 40 and 46 are made of first materials respectively. The first portion 40 is a center aero panel, wherein the first portion 46 is an aft aero panel.

The respective second portion 42, 44 and 46 are made of second materials respectively, wherein the respective second material is different from the respective first material. For example, the respective first material is a semi-rigid material such as TPO (thermoplastic elastomer based on olefin) or similar and designed to maintain an aerodynamic shape under normal operating conditions but deflect when impacted, wherein impact events in respective areas of the first portions 40 and 46 will be few. The respective second material is a semi-flexible material such as EPDM (Ethylene-Propylene-Dien-Monomer) or similar so that the second material and thus the respective second portions 42, 44 and 48 are more flexible or softer than the respective first portions 40 and 46. The respective second portions 42, 44 and 48 are designed to maintain an aerodynamic shape under most operating conditions but deflect when impacted. Impact events in respective areas in which the respective second portions 42, 44 and 48 are arranged will be frequent. Using a different material for the second portions 42, 44 and 48 allows for an increase in the effective surface area of the respective aerodynamic panels in the form of the fairings 36 and 38 with little impact on the durability or structural integrity of the whole panels.

As can be seen from FIG. 1, the second portion 42 forms a center aero panel upper extension and an edge region of the fairing 36. Moreover, the second portion 44 forms a center aero panel lower extension and a further edge region of the fairing 36. Thus, the second portion 42 adjoins the first portion 40 in the vertical direction of the vehicle towards the top, wherein the second portion 44 adjoins the first portion 40 in the vertical direction of the vehicle towards the bottom. Moreover, the fairings 36 and 38 are arranged at a distance from each other in the longitudinal direction of the vehicle. The second portion 48 is an aft aero panel upper extension which adjoins the first portion 46 in the vertical direction of the vehicle towards the top and towards the bottom and in the longitudinal direction of the vehicle towards the back.

Furthermore, respective tire clearance gaps are indicated by 50 in FIG. 1. As can be seen from FIG. 1, the design of the fairing assembly 10 provides minimal panel-to-tire gaps (tire clearance gaps 50) which prevent tire-to-panel contact under normal articulation of a suspension of the respective drive axle 14 and 16. Assembly tolerances and tire size variances are also considered. Since the respective fairings 36 and 38 are used to cover respective portions of the commercial vehicle and guide air, the respective fairings 36 and 38 are also referred to as panels or aero panels.

Figure 2:
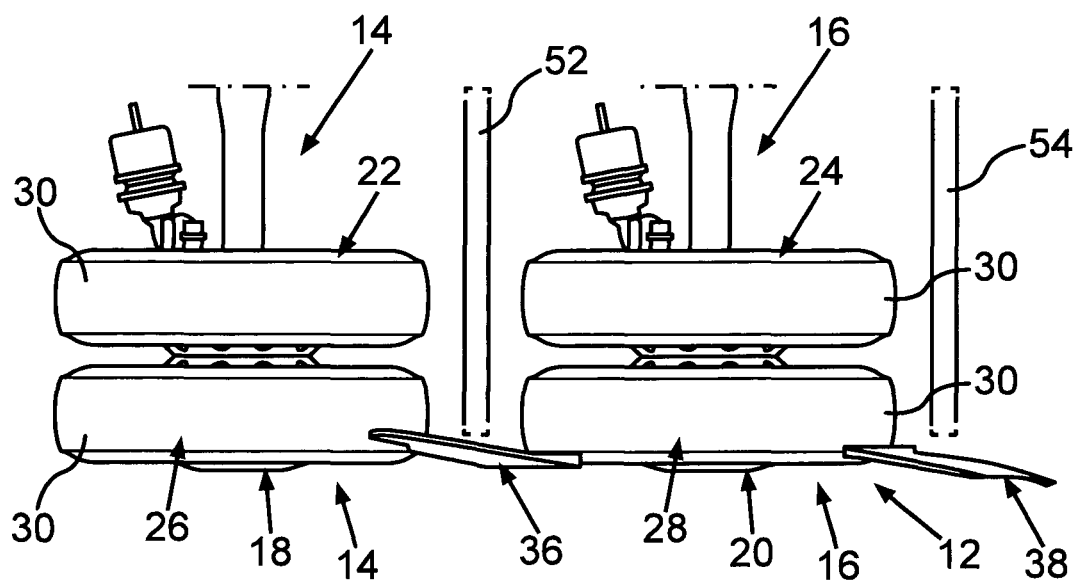
FIG. 2 is a schematic top view of the fairing assembly.

FIG. 2 shows the fairing assembly 10 in a schematic top view. As can be seen from FIG. 2, respective panel supports 52 and 54 are used to mount the panels (fairings 36 and 38) on, for example, a frame of the commercial vehicle. FIG. 3 shows the fairings 36 and 38 in a schematic sectional view. As can be seen from FIGS. 3 and 4 the forward fairing 36 extends in the longitudinal direction of the vehicle from front to back, i.e., from the wheel 26 to the wheel 28 and outwardly with respect to the transverse direction of the vehicle. This means the fairing 36 does not extend parallel to the longitudinal direction of the vehicle but angularly thereto. Moreover, the rear fairing 38 extends in the longitudinal direction of the vehicle from front to back, i.e., away from the drive wheel 28 and outwardly with respect to the transverse direction of the vehicle.

In FIG. 4, directional arrows 56 illustrate a wind direction at yaw. The aerodynamic features of the fairing assembly 10 are most effective when the wind direction is not parallel to the vehicle frame or the longitudinal direction of the vehicle. 0 to 9 degrees of yaw is common under normal operating conditions. The wind or air flowing against the fairing assembly 10 can be deflected and guided by means of the fairing assembly 10, i.e., by the fairing 36 and 38 in a particularly advantageous manner.

Figure 6:
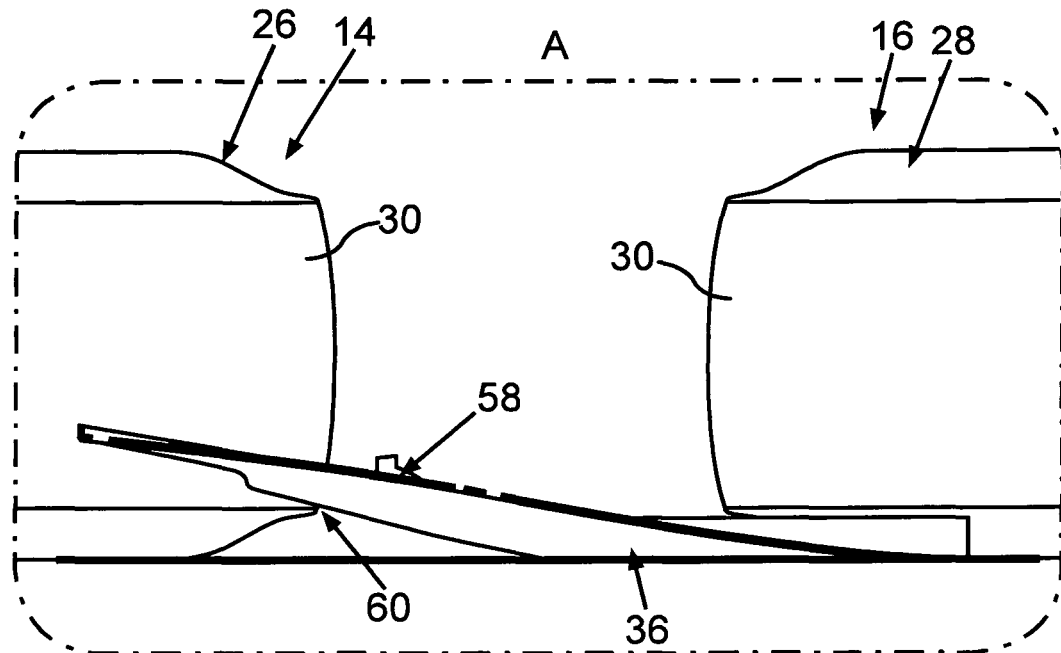
FIG. 6 is a schematic detail view of an area A shown in FIG. 3.

FIG. 6 shows a cross sectional profile 58 of the forward fairing 36 in detail. At most elevations, the cross sectional profile 58 of the forward fairing 36 being a center panel begins at or slightly inboard of an outer tire tread edge 60 of the tire 30 of the wheel 26 and then progresses outwards until just outboard of the tire wall. The cross sectional profile 58 is generally cubic with some deviation for styling purposes. The resulting shape "shingling" effectively intercepts airflow from penetrating the leading tire gap and diverts it outboard and around the trailing tire gap and rear tire with minimal disruption continuity.

Figure 7:
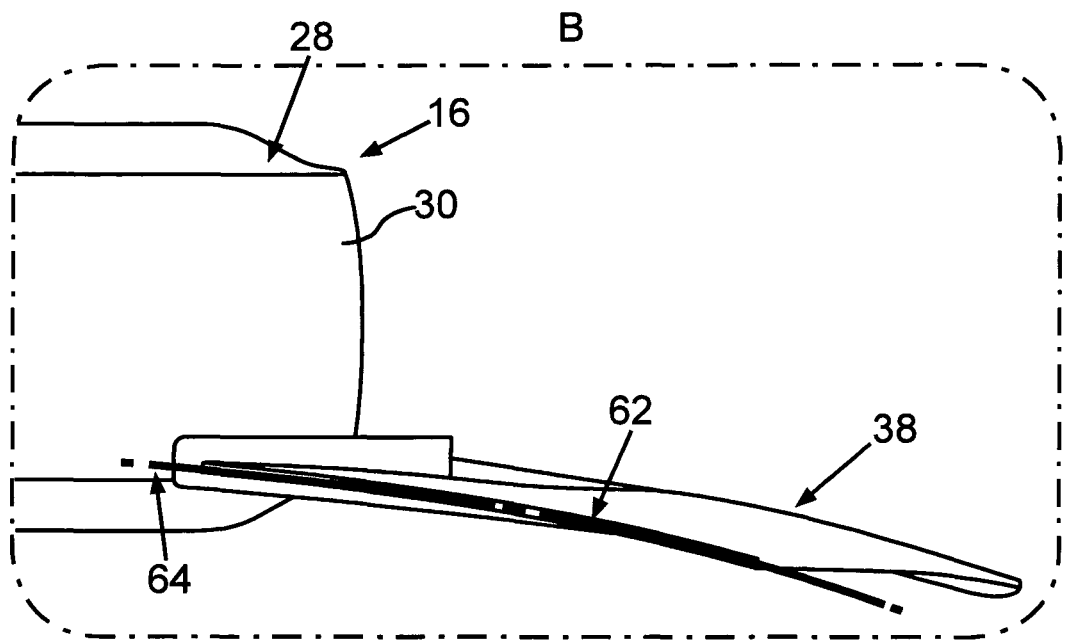
FIG. 7 is a schematic detail view of an area B shown in FIG. 3.

FIG. 7 shows a cross sectional profile 62 of the fairing 38 being an aft panel. At any elevation, the cross sectional profile 62 of the aft panel begins at or slightly inboard of an outer tire tread edge 64 of the tire 30 of the wheel 28 and grows progressively outward until ending abruptly some distance outboard of the tire wall. The cross sectional profile 62 is generally quadratic with some deviation for styling purposes. The resulting air ramp gives outward momentum to the air stream which prevents some inboard flow from interacting with aero-disruptive features on the trailer. Thus, the fairing assembly 10 controls aerodynamic flow near the wheels 26 and 28 of the tractor pulling the trailer. The fairing assembly 10 serves to decrease anti-motive aerodynamic forces in close proximity to the wheels 26 and 28 and also condition the flow for better performance downstream around shapes and features of the trailer. The surface shapes and features of the fairing assembly 10 can improve the marginal performance with respect to aerodynamics by more than 50%. FIG. 5 shows a sectional view of the fairing assembly 10 along a cut line B-B shown in FIG. 1. As can be seen from FIG. 5, the forward fairing 36 is arranged between the drive wheels 26 and 28 and extends at least substantially angularly to the longitudinal direction of the vehicle.

The cross sectional profile 62 of the aft panel (fairing 38) is arranged in a plane of the longitudinal direction of the vehicle and the transverse direction of the vehicle, the plane being also referred to as XY-plane.

Figure 8:
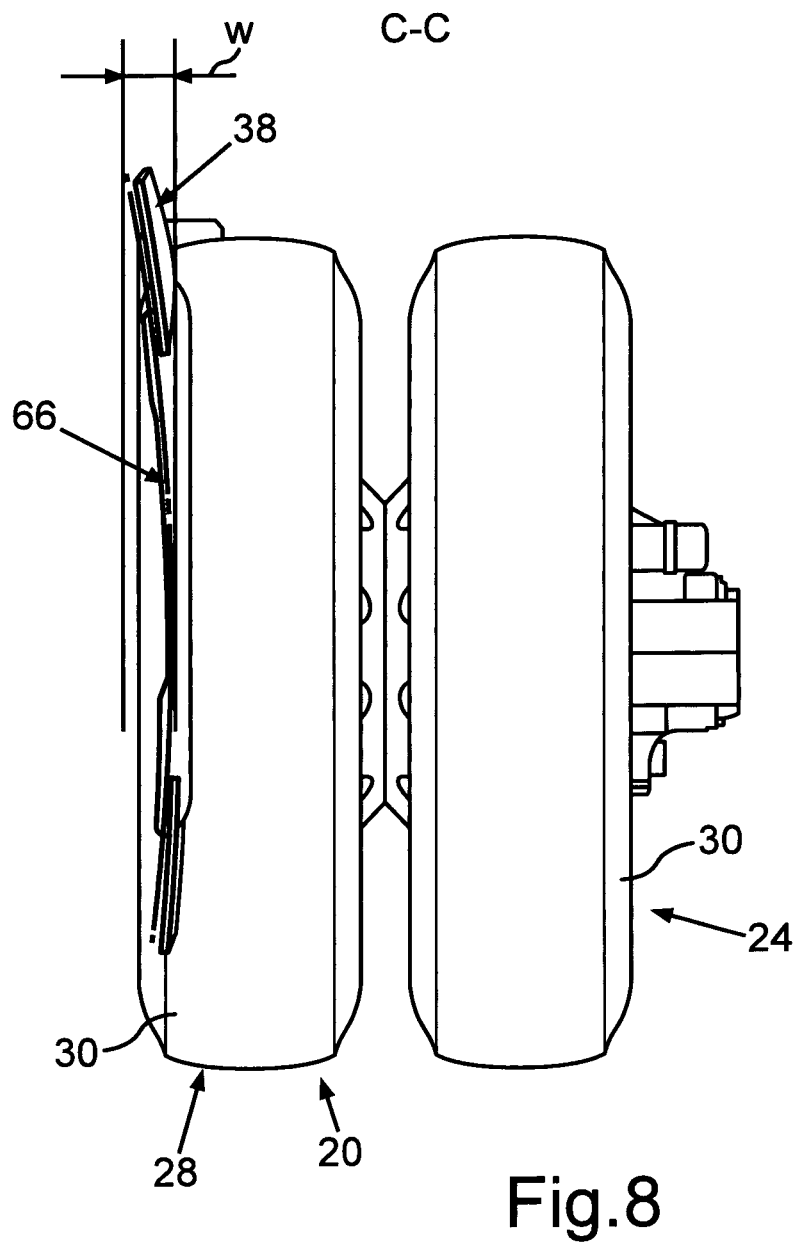
FIG. 8 a schematic sectional view of the fairing assembly along a cut line C-C shown in FIG. 1.

FIG. 8 shows a cross sectional profile 66 of the rear fairing 38 in a plane of the transverse direction of the vehicle and the vertical direction of the vehicle, the plane being also referred to as YZ-plane. At any longitudinal position, the cross sectional profile 66 of the fairing 38 is concave, wherein a width of the fairing 38 is indicated by w. This is intended to reduce flow diversions which helps to sustain the outward momentum of the air flow compelled by the air ramp formed by the cross sectional profile 62.

As can be seen from FIGS. 1 to 8, the fairing assembly 10 is used for a tandem axle and thus a dual drive wheel configuration. Alternatively, the panels (fairings 36 and 38) may be positioned relative to a single drive wheel configuration, i.e., wide based tires.

As can be seen from the figures, the shape of the fairing 36 is optimized for aerodynamics. The outboard horizontal surface lines of the fairing 36 begin at distance inboard of the tire tread and include an obvious kickout feature which more effectively captures air deflecting off the back edge of the tire 30 and diverts it outboard and around the rear tire. Furthermore, the aft panel (fairing 38) uses a kickout feature in an effort to divert flow that would normally flow towards and around a trailer landing gear and other non-aerodynamic features of the trailer. The outboard vertical surface lines of the aft panel are generally concave. The resulting air stream is convergent and speeding up. In theory, and seemingly in practice, the air moves further down the trailer before eventually reconnecting with the non-aerodynamic features or surfaces of the trailer. Thus, particularly advantageous aerodynamics of the commercial vehicle can be realized so that the commercial vehicle can be driven particularly efficiently.

The invention claimed is:

1. A fairing assembly for a commercial vehicle, comprising:
   a forward fairing configured to be disposed such that the forward fairing begins inboard of an outer tire tread edge of a tire of a forward drive wheel and progresses outwards to end outboard of a wall of the tire of the forward drive wheel with respect to a longitudinal direction of the commercial vehicle; and
   a rear fairing configured to be disposed such that the rear fairing begins inboard of an outer tire tread edge of a tire of a rear drive wheel and progresses outwards to end outboard of a wall of the tire of the rear drive wheel with respect to the longitudinal direction of the commercial vehicle, wherein the rear fairing has a concave cross-section in a transverse direction of the commercial vehicle.

2. A commercial vehicle, comprising:
   an axle; and
   a fairing assembly according to claim 1.

3. The commercial vehicle according to claim 2, wherein the commercial vehicle is a tractor.

4. The fairing assembly according to claim 1, wherein the forward fairing and the rear fairing each include a respective first portion made of a first material and a respective second portion adjoining the first portion and wherein the second portion is made of a second material that is different from the first material.

5. The fairing assembly according to claim 4, wherein the first material is a first plastic material.

6. The fairing assembly according to claim 5, wherein the first plastic material is a thermoplastic elastomer based on olefin.

7. The fairing assembly according to claim 4, wherein the second material is a second plastic material.

8. The fairing assembly according to claim 7, wherein the second plastic material is an Ethylene-Propylene-Dien-Monomer rubber.

9. The fairing assembly according to claim 4, wherein the respective first portion has a higher rigidity than the respective second portion.

10. The fairing assembly according to claim 4, wherein the respective second portion forms a respective edge region of the respective fairing.

11. The fairing assembly according to claim 1, wherein a cross-sectional profile of the forward fairing is cubic.

12. The fairing assembly according to claim 1, wherein a cross-sectional profile of the rear fairing is quadratic.

* * * * *